Oct. 11, 1949.    E. GROPPELL    2,484,286
HATCH COVER

Filed May 1, 1947    2 Sheets-Sheet 1

Inventor
EUGENE GROPPELL

By C. L. Parker
Attorney

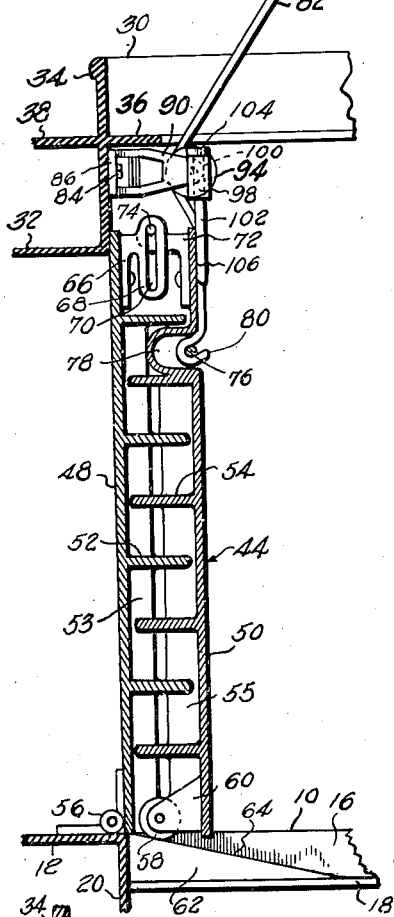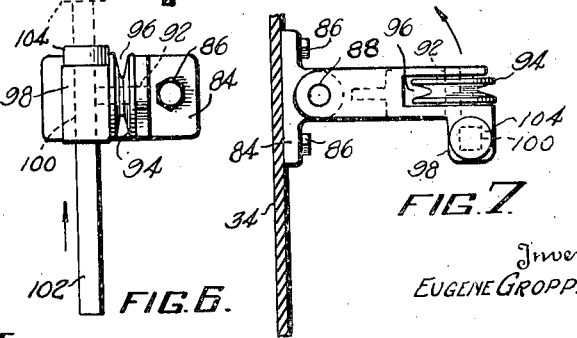

Patented Oct. 11, 1949

2,484,286

UNITED STATES PATENT OFFICE 2,484,286

HATCH COVER

Eugene Groppell, New Orleans, La.

Application May 1, 1947, Serial No. 745,351

10 Claims. (Cl. 114—201)

The present invention relates generally to ships and is more particularly concerned with an improved hatch cover for a cargo vessel.

The usual cargo vessel or freighter employed in modern shipping embodies certain characteristics which distinguish it from other ships such as those primarily adapted for the transportation of persons or animals, tankers, and the like, quite as definitely as these other types of ships distinguish from one another. Such distinguishing characteristics are in general related to the special problems involved in the expeditious handling of large volumes of cargo usually comprising packages and articles of widely varying sizes, shapes and weights and frequently including extremely large and bulky objects. It is thus of fundamental importance in cargo vessels to provide for easy access to the holds or other storage spaces and to this end is customary to provide a minimum number of either complete or platform decks below the main deck, together with cargo hatches of the maximum permissible dimensions.

In the construction of large size vertically aligned cargo hatches of the type referred to above, it is of course necessary that any longitudinal beams, bulkheads, or other primary structural elements of the ship be cut away and replaced by suitable carlings, stanchions, or the like. Consequently the regions in a cargo vessel immediately adjacent the cargo hatches are quite generally provided with a relatively large number of such auxiliary structural members, so that the accurate interfitting of the hatch covers and the elimination of obstructions to provide the maximum area of hatch opening become of critical importance, particularly in the case of the lower or so-called "tween" decks. Thus any improvement which permits greater freedom in plumbing the holds by means of the usual cargo lift, whether arranged as a span or in the form of booms or yards employing burtons or other topping devices, goes directly to the heart of the shipping problem.

Accordingly the principal object of the present invention is to provide improved hatch covers for a cargo vessel of the type described above which may be quickly and easily raised to open position to provide the maximum available hatch opening and which may subsequently be automatically lowered solely under the influence of the force of gravity.

Another object of the invention is to provide an improved hatch cover for a lower deck of a cargo vessel which may be easily handled in opening and closing and at the same time will be sufficiently strong to support cargo thereon when in closed position.

A further object of the invention is to provide a folding hatch cover of the type described embodying improved hinge and foot structure to obtain controlled gravity lowering.

An additional object of the invention is to provide an improved combination hatch cover retainer and cargo lift fair-lead of novel construction.

A further object of the invention is to provide a hatch cover of the type described embodying improved safety features.

Other objects and advantages of the invention will become apparent during the course of the following description.

In the drawings I have show two embodiments of the invention. In this showing

Fig. 3 is a longitudinal vertical sectional view illustrating one half of a preferred embodiment of hatch cover in accordance with the present invention and showing the same in raised or open position;

Fig. 4 is a longitudinal vertical sectional view similar to Fig. 3 but illustrating a modified form of hatch cover in accordance with the present invention;

Fig. 5 is a side elevation of the improved combination cover retainer and fair-lead device constituting a part of the present invention, illustrating the same in operative position relative to a fragment of a hatch cover;

Fig. 6 is an end view of the combination device of Fig. 5; and

Fig. 7 is a top plan view of the combination device of Figs. 5 and 6.

Figure 1:
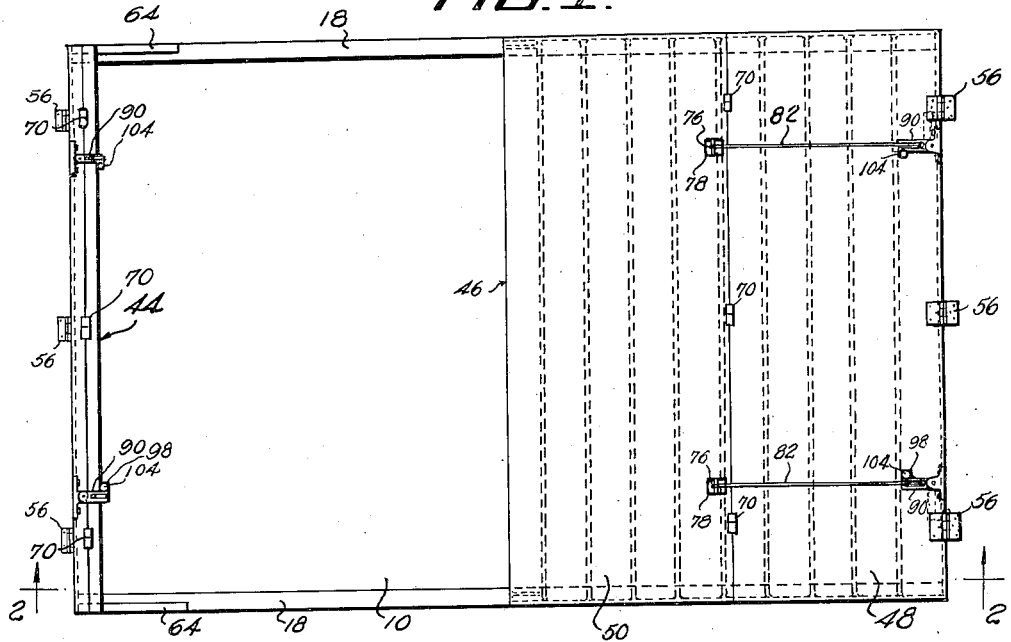
Fig. 1 is a top plan view of a complete hatch cover in accordance with the present invention wherein one half of the cover is illustrated in open and the other half in closed position.
Figure 2:
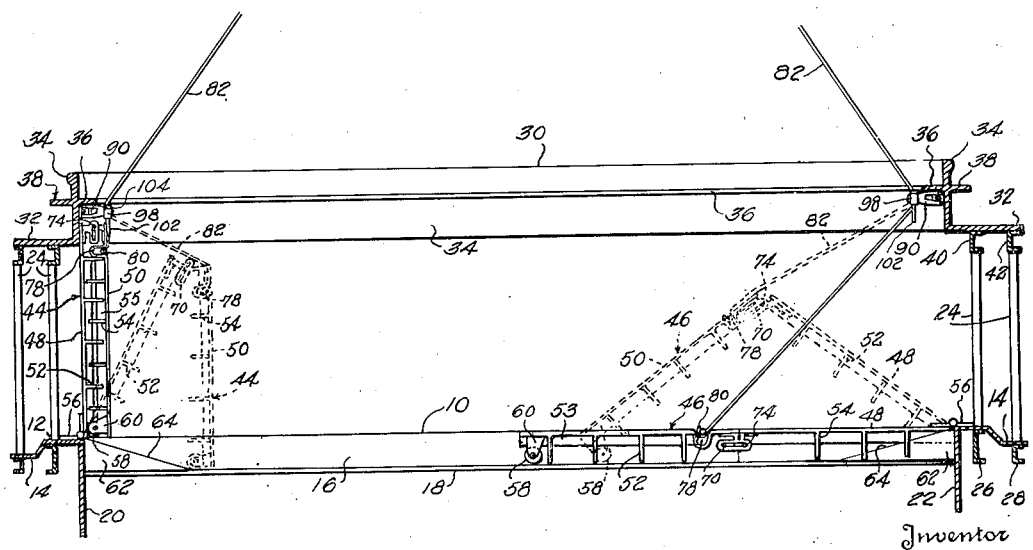
Fig. 2 is a longitudinal vertical cross section through the complete hatch cover taken substantially along the line 2—2 of Fig. 1 and illustrating intermediate positions of the cover in dotted lines.

Referring to the drawings and in particular to Figs. 1 and 2 thereof my improved folding hatch covers are shown in the positions they would occupy when assembled in such manner as to control access to a lower hatch 10 formed in the raised portion 12 of the lower or "tween" deck 14 of a typical cargo vessel. The sides of the lower hatch 10 are formed by a pair of auxiliary longitudinal beams or carlings 16 of generally angle shape in cross section having flanges 18 which project inwardly to form ledges at opposite sides of the hatchway. Beneath the lower deck 14, as shown particularly in Fig. 2, fragmentary portions of bulkheads 20 and 22 have been left in position while above the lower deck 14 all bulkheads in the vicinity of the hatchway have been removed and replaced by means of suitable stanchions 24 resting upon auxiliary transverse deck beams 26 and 28, the latter being structurally joined in any suitable manner to the raised portion 12 and the lower deck 14, respectively.

The lower hatch 10 is in vertical alignment with an upper hatch 30 provided in the main deck 32 of the ship and including a raised coaming 34 having inner and outer horizontally projecting ledges 36 and 38, respectively, thereon. As shown at the right-hand portion of Fig. 2, the stanchions 24 are connected at their upper ends to the main deck 32 through intermediary supports in the form of deck beams or frames 40 and 42 and it will be understood that for the sake of simplicity and clarity the additional framing, structural members, and hatch covers for the main deck 32 have been entirely omitted from the drawings. The hatch covers for the hatch 10 are designated generally by reference numerals 44 and 46 in Fig. 2 and will be described in detail below.

Referring to Fig. 3, the hatch cover 44 comprises two folding parts in the form of inner and outer members 48 and 50, respectively, constituting generally rectangular, flat panels in plan form and each provided with a plurality of transverse stiffening ribs 52 and 54, respectively, extending across the lower surface of the members in staggered relationship so as to provide clearance therebetween when the members 48 and 50 are fully opened and nested together. A pair of hinges 56 serves to pivotally connect one edge of the inner panel 48 to the deck 12 adjacent the hatch 10 while the extreme outer corners of the outer panel 50 are provided with rollers or wheels 58 rotatably mounted in suitable brackets 60 and adapted to engage and run along the upper surfaces of the flanges 18, the latter serving as a trackway for this purpose. At their opposite ends the beams 16 are provided with wedges 62 having inwardly and downwardly inclined upper surfaces 64 constituting continuations of the tracks formed by the flanges 18, the function of which will hereinafter be more fully described.

The adjacent transverse edges of the members 48 and 50 are pivotally connected by means of a pair of hinges of special construction arranged to provide for a limited amount of translational movement between the inner and outer members as well as the usual rotational movement therebetween. As shown in Fig. 3, each of these hinges comprises a bracket 66 suitably attached to the member 48 and provided with a bifurcated portion 68 having parallel elongated slots 70 therein. The outer member 50 is provided with a somewhat similar bracket 72 having a pin 74 attached thereto and slidably and rotatably received within the elongated slots 70. It will also be noted in Figs. 1 and 3 that each of the outer members 50 is provided with a pair of recessed grips 76 formed in suitable indentations 78 in the upper surface thereof and adapted to be engaged by the usual hooks 80 of the cargo lift 82.

From the description thus far it will be apparent that the opening of the hatch covers may be accomplished by exerting tension upon the cargo lift, thereby causing the inner and outer members 48 and 50 to pivot upwardly about the hinges 56 and at the same time to fold together in jackknife fashion about the hinges formed by the pins 74 in the slots 70.

Referring again to Fig. 3 and also particularly to Figs. 5-7, there is illustrated a combination cover retainer and cargo lift fair-lead which is seen to comprise a fixed base 84 secured in any convenient manner to the inner wall of the coaming 34 beneath the ledge 36 as by means of a plurality of bolts 86. The base 84 is provided with a vertical pivot pin 88 (Fig. 7) which is also received within suitable bearings formed at one end of a double bifurcated bracket 90. At its opposite end the bracket 90 is similarly bifurcated but at approximately 90° to that previously mentioned and carries a horizontal stub axle 92. A sheave 94 is rotatably mounted on the stub axle 92 in such manner as to provide a swallow 96 adapted to receive the cargo lift 82 to provide a fair-lead for the latter.

It will also be noted in Figs. 5 to 7 that a boss 98 is provided at one side of the sheave 94 having a vertical open socket 100 therein, preferably of square cross section, adapted to slidably receive therein a retaining bolt 102 having a head 104 at its top end. As will be apparent from inspection of Figs. 3 and 5, the bolt 102 is adapted to retain the inner and outer members 48 and 50 in their upper or open position by engagement with the edge portion 106 of the latter and the bolt 102 may be raised upwardly within its socket 100 to permit the cover to be lowered. It should also be particularly noted that when not in use, the bracket 90 may be swung about its pivot 88 into a retracted position in which it lies substantially wholly beneath the shelf 36.

In the modified form of the device, as illustrated in Fig. 4, the majority of the various elements remain substantially the same, the principal difference residing in the construction of the foot or the extreme outer edge portion of the outer member 50. As illustrated in this figure, the foot portion of the outer member 50 is constructed as a separate panel 108 pivotally connected to the main body of the member 50 as by means of suitable hinges 110. Thus in the construction according to Fig. 4, when the covers are open, the rollers 58 extend outwardly beyond the position which they occupy in the preferred form of apparatus illustrated in Fig. 3 by reason of the pivoting action of the foot panel 108, the latter together with the main body of the outer member 50 being of somewhat greater over-all length than the single outer member 50 in Fig. 3.

Although the operation of the device will be largely apparent from the foregoing description, it may be briefly described as follows. Assuming the hatch covers to be initially closed, the first step to be performed in opening the covers is to swing the brackets 90 outwardly about their pivots 88 away from the vertical wall of the coaming 34 so that the ends of the cargo lifts 82 may be inserted through the swallows 96 and engage the sheaves 94 to provide fair-leads. The usual hooks 80 of the cargo lifts 82 are then engaged with the grips 76 in the surface of the outer members 50 so that upon suitable tension being applied to the cargo lifts 82 by means of the usual winch or other power apparatus (not shown) the cover will be lifted, pivoting about the hinges 56 and the inner and outer members 48 and 50 pivoting together into folded position.

During the entire lifting operation the rollers 58 engage either the flanges 18 or the inclined surfaces 64 of the wedges 62 so that the hatch cover is at all times supported by a structural member of the ship, thus constituting an important safety feature. When the members 48 and 50 are fully opened into the position illustrated in Figs. 3 and 4, the bolts 102 may be inserted into the sockets 100 and pushed downwardly into the position illustrated in Figs. 3 and 5 to retain the covers in open position so that the cargo lifts 82 may be disengaged from the grips 76 and employed for other tasks such as loading or unloading operations.

When it is desired to close the hatch covers, the cargo lifts 82 are again engaged with the grips 76 and the bolts 102 withdrawn from their sockets 100. Referring particularly to Fig. 3 it will be noted that the weight of the outer members 50 rests substantially entirely upon the rollers 58 which in turn engage the upper surfaces 64 of the wedges 62. Thus, when the bolts 102 are withdrawn, the outer members 50 tend to move in a downward direction relative to the inner members 48 by reason of the permissible translational movement between the pins 74 and the elongated slots 70. Such downward movement of the outer members 50 under the action of the force of gravity is resisted by the wedges 62 which permit only a small horizontal component of such force to become effective and thereby initiate the outward or unfolding movement of the covers. As the rollers 58 start outwardly down the inclined surfaces 64, and ultimately along the tracks formed by the flanges 18, the weight of the covers is held in check by the cargo lifts 82 so that the closing operation may be performed in a gradual and easy fashion.

When the covers are completely closed, it will be noted that the transverse stiffening ribs 52 and 54 will have moved from their nested position in such manner as to engage the flanges 18 and thereby strengthen and support the covers. In the operation of the modified form of apparatus illustrated in Fig. 4 the closing movement of the covers, which is initiated by the inclined surfaces 64 of the wedges 62, will be relatively faster, although this form of apparatus is generally not to be preferred since it tends to slightly restrict the amount of available opening of the hatchway when the hatch covers are open due to the projecting foot portions 108.

It will be observed that during the raising and lowering operation the transverse stiffening ribs 52 and 54 serve to strengthen the inner and outer members 48 and 50 although for additional security there are also provided longitudinal stiffening ribs 53 and 55 at the extreme outer longitudinal edges of the members 48 and 50, respectively. By reason of the free pivoting action of the brackets 90 it will also be noted that the latter are free to follow the inclinations of the cargo lifts 82 which may be occasioned by swinging movement of the booms or other structures to which they are attached.

While only two embodiments of the invention have been described in detail herein, it will be obvious that numerous modifications, alterations, and deviations will occur to one skilled in the art without departing from the spirit or scope of the invention. For example, it is contemplated that the sheaves 94 may take the form of snatch block structures of any of several well-known types. Also it is to be understood that numerous changes can be made in size, materials, and arrangement of parts without departing from the principles of the invention as set forth in the appended claims.

I claim:

1. In a vessel having a cargo lift and at least two decks provided with aligned hatchways therein, a coaming surrounding the upper of said hatchways including a horizontal shelf projecting inwardly therearound, a pair of folding hatch covers hingedly mounted adjacent opposite ends of the lower of said hatchways, each including two parts pivotally connected together and movable upwardly into substantially vertical position when fully open, recessed grips in the surface of said covers adapted to be engaged by said lift for raising and lowering said covers, and a plurality of combination cover retaining devices and fair-leads for said lift comprising brackets pivotally mounted for horizontal swinging movement on said coaming beneath said shelf, the free ends of said brackets being bifurcated and including sheaves rotatably mounted therein for guiding said lift, vertical open sockets formed at the free ends of said brackets at one side of said sheaves, and headed retaining bolts slidable within said sockets and engageable in one position with said covers for retaining the latter in open position.

2. In a vessel having a cargo lift and at least two decks provided with aligned hatchways therein, a coaming surrounding the upper of said hatchways including a horizontal shelf projecting inwardly therearound, a pair of folding hatch covers hingedly mounted adjacent opposite ends of the lower of said hatchways, each including two parts pivotally connected together and movable upwardly into substantially vertical position when fully open, and a plurality of combination cover retaining devices and fair-leads for said lift comprising brackets pivotally mounted for horizontal swinging movement on said coaming beneath said shelf, the free ends of said brackets being bifurcated and including sheaves rotatably mounted therein for guiding said lift, vertical open sockets formed at the free ends of said brackets at one side of said sheaves, and retaining bolts slidable within said sockets and engageable in one position with said covers for retaining the latter in open position.

3. In a vessel having a cargo lift and at least two decks provided with aligned hatchways therein, a coaming surrounding the upper of said hatchways, a pair of folding hatch covers hingedly mounted adjacent opposite ends of the lower of said hatchways, and a plurality of combination cover retaining devices and fair-leads for said lift comprising brackets pivotally mounted for horizontal swinging movement on said coaming, the free ends of said brackets being bifurcated and including sheaves rotatably mounted therein for guiding said lift, vertical open sockets formed at the free ends of said brackets at one side of said sheaves, and retaining bolts slidable within said sockets and engageable in one position with said covers for retaining the latter in open position.

4. In a vessel having a cargo lift and at least two decks provided with aligned hatchways therein, a folding hatch cover hingedly mounted adjacent one end of the lower of said hatchways, and a combination cover retaining device and fair-lead for said lift comprising a bracket pivotally mounted adjacent the upper of said hatchways, the free end of said bracket being bifurcated and including a sheave rotatably mounted therein for guiding said lift, a vertical open socket formed at the free end of said bracket at one side of said sheave, and a retaining bolt slidable within said socket and engageable in one position with said cover for retaining the latter in open position.

5. In a vessel having a cargo lift and a hatchway provided with a folding hatch cover therefor, a device for guiding said lift and holding said cover in open position comprising a bracket adapted to be mounted adjacent an upper peripheral portion of said cover when the latter is in open position, a sheave rotatably mounted on said bracket, and means on said bracket releasably engageable with said cover.

6. In a cargo vessel having at least two decks provided with aligned hatches therein, a pair of folding hatch covers hingedly mounted adjacent opposite ends of the lower of said hatches, each including inner and outer members movable upwardly into substantially vertical position when fully open, a plurality of transverse stiffening ribs extending across the lower surface of said members in staggered relationship providing nesting clearance when said covers are fully open, retaining means mounted adjacent the upper of said hatches and releasably engageable with said covers for holding the latter in open position, a pair of beams extending longitudinally at opposite sides of the lower of said hatches including inwardly projecting ledges thereon, inwardly and downwardly inclined wedges adjacent opposite ends of said beams, rollers at the outer corners of said outer members adapted to run along said ledges during opening and closing movement of said covers, and hinge means pivotally connecting said inner and outer members constructed and arranged to provide limited translational movement between the latter operable in conjunction with the engagement between said rollers and said wedges to initiate closing movement of said covers solely by action of the force of gravity.

7. In a cargo vessel having at least two decks provided with aligned hatches therein, a pair of folding hatch covers hingedly mounted adjacent opposite ends of the lower of said hatches, each including inner and outer members movable upwardly into substantially vertical position when fully open, retaining means mounted adjacent the upper of said hatches and releasably engageable with said covers for holding the latter in open position, a pair of beams extending longitudinally at opposite sides of the lower of said hatches including inwardly projecting ledges thereon, inwardly and downwardly inclined wedges adjacent opposite ends of said beams, rollers at the outer corners of said outer members adapted to run along said ledges during opening and closing movement of said covers, and hinge means pivotally connecting said inner and outer members constructed and arranged to provide limited translational movement between the latter operable in conjunction with the engagement between said rollers and said wedges to initiate closing movement of said covers solely by action of the force of gravity.

8. In a cargo vessel having at least two decks provided with aligned hatches therein, a pair of folding hatch covers hingedly mounted adjacent opposite ends of the lower of said hatches, each including inner and outer members movable upwardly into substantially vertical position when fully open, a pair of beams extending longitudinally at opposite sides of the lower of said hatches, including inwardly projecting ledges thereon, inwardly and downwardly inclined wedges adjacent opposite ends of said beams, rollers at the outer corners of said outer members adapted to run along said ledges during opening and closing movement of said covers, and hinge means pivotally connecting said inner and outer members and including relatively slidable elements providing limited translational movement between the latter operable in conjunction with the engagement between said rollers and said wedges to initiate closing movement of said covers solely by action of the force of gravity.

9. In a cargo vessel having a deck provided with a hatch therein, a folding hatch cover hingedly mounted adjacent one end of said hatch including inner and outer members movable upwardly into substantially vertical position when fully open, track means extending longitudinally at opposite sides of said hatch, including inwardly and downwardly inclined portions adjacent said one end of said hatch, rollers at the outer corners of said outer member adapted to run along said track means during opening and closing movement of said cover, and hinge means pivotally connecting said inner and outer members constructed and arranged to provide limited translational movement between the latter operable in conjunction with the engagement between said rollers and said track means to initiate closing movement of said cover solely by action of the force of gravity.

10. A folding hatch cover as set forth in claim 9 wherein said outer member is slightly longer than said inner member and further includes additional hinge means pivotally mounting the lower portion of said outer member for outward swinging movement as said cover is opened.

EUGENE GROPPELL.

REFERENCES CITED

The following references are of record in the file of this patent:

UNITED STATES PATENTS

| Number | Name | Date |
| --- | --- | --- |
| 1,835,855 | Fliegel | Dec. 8, 1931 |

FOREIGN PATENTS

| Number | Country | Date |
| --- | --- | --- |
| 1,585 | Great Britain | Jan. 24, 1894 |
| 200,200 | Great Britain | July 9, 1923 |
| 432,925 | Great Britain | Aug. 6, 1935 |
| 466,019 | Great Britain | May 14, 1937 |